US012781914B2

(12) United States Patent
Tan et al.

(10) Patent No.: US 12,781,914 B2
(45) Date of Patent: Nov. 3, 2026

(54) ADJUSTABLE MOUNTING ASSEMBLY

(71) Applicant: Robert Bosch GmbH, Stuttgart (DE)

(72) Inventors: Jie Tan, Jiangmen City (CN); Shawn Filipek, Savage, MN (US); Andrew Pardoe, Eden Prairie, MN (US); Christopher Hart, Grantsburg, WI (US)

(73) Assignee: Bosch Security Systems, LLC, Fairport, NY (US)

( * ) Notice: Subject to any disclaimer, the term of this patent is extended or adjusted under 35 U.S.C. 154(b) by 29 days.

(21) Appl. No.: 18/977,152

(22) Filed: Dec. 11, 2024

(65) Prior Publication Data

US 2025/0377072 A1 Dec. 11, 2025

Related U.S. Application Data

(60) Provisional application No. 63/658,662, filed on Jun. 11, 2024.

(51) Int. Cl.
*H04R 1/02* (2006.01)
*F16M 11/10* (2006.01)
(Continued)

(52) U.S. Cl.
CPC ............ *F16M 13/02* (2013.01); *F16M 11/10* (2013.01); *F16M 11/2014* (2013.01); *H04R 1/026* (2013.01); *H04R 2201/021* (2013.01)

(58) Field of Classification Search
CPC .... F16M 11/10; F16M 11/2014; H04R 1/026; H04R 2201/021
(Continued)

(56) References Cited

U.S. PATENT DOCUMENTS 2,481,717 A * 9/1949 Blair ...................... F16M 11/10 396/428
4,489,910 A * 12/1984 Ferguson ............... G08G 1/095 248/230.8
(Continued)

OTHER PUBLICATIONS

Tannnoy, “Tannoy VLS Series Passive Column Array Loudspeakers User Guide,” <https://device.report/manual/559651> web page visited May 10, 2024 (22 pages).
(Continued)

*Primary Examiner* — Nkeisha Smith
(74) *Attorney, Agent, or Firm* — Michael Best & Friedrich LLP

(57) ABSTRACT

A mounting assembly for an electronic device includes a device-side bracket configured to be secured to a rear surface of the electronic device, a tilt bracket pivotably coupled to the device-side bracket, and a pan bracket detachably and pivotably coupled to the tilt bracket. The tilt bracket includes a first wall mount interface. The tilt bracket is securable at a plurality of angles relative to the device-side bracket. The pan bracket includes a second wall mount interface. The mounting assembly is adjustable between a first configuration and a second configuration. In the first configuration, the pan bracket is detached from the tilt bracket, and the first wall mount interface is configured to mount to a wall surface. In the second configuration, the pan bracket is attached to the tilt bracket, and the second wall mount interface is configured to mount to the wall surface.

10 Claims, 9 Drawing Sheets

(51) Int. Cl.
*F16M 11/20* (2006.01)
*F16M 13/02* (2006.01)

(58) Field of Classification Search
USPC ............ 248/274.1, 292.14, 299.1, 919–923, 248/286.12, 284.1, 282.1, 285.1
See application file for complete search history.

(56) References Cited

U.S. PATENT DOCUMENTS

| | | | | |
|---|---|---|---|---|
| 5,320,311 | A * | 6/1994 | Jensen | F16M 11/10 248/292.12 |
| 6,113,047 | A * | 9/2000 | Wung | B60R 11/0235 248/917 |
| 6,126,128 | A * | 10/2000 | Costa | F16M 11/10 248/278.1 |
| 6,402,109 | B1 | 6/2002 | Dittmer | |
| 7,513,474 | B2 * | 4/2009 | Anderson | F16M 11/10 248/922 |
| 7,641,163 | B2 * | 1/2010 | O'Keene | F16M 11/10 248/920 |
| 7,954,777 | B2 * | 6/2011 | Bohm | H01Q 1/1221 403/57 |
| 10,638,083 | B1 * | 4/2020 | Monroe | G09F 15/0012 |
| 11,856,347 | B1 * | 12/2023 | Roberts | F16M 11/2014 |
| 12,276,376 | B1 * | 4/2025 | Jia | H04R 1/026 |
| 2002/0033436 | A1 * | 3/2002 | Peng | F16M 11/10 248/284.1 |
| 2002/0084396 | A1 * | 7/2002 | Weaver | F16M 13/02 248/278.1 |
| 2004/0245420 | A1 * | 12/2004 | Pfister | F16M 11/10 248/289.11 |
| 2006/0291152 | A1 * | 12/2006 | Bremmon | F16M 11/10 361/679.06 |
| 2007/0040085 | A1 | 2/2007 | Pincek et al. | |
| 2007/0075202 | A1 * | 4/2007 | Gordon | H04R 1/026 248/292.12 |
| 2007/0090250 | A1 * | 4/2007 | O'Keene | F16M 11/10 248/299.1 |
| 2007/0176067 | A1 * | 8/2007 | Monaco | F16M 13/02 248/284.1 |
| 2008/0315049 | A1 * | 12/2008 | Bailo | F16M 11/10 248/176.1 |
| 2012/0012724 | A1 | 1/2012 | Monaco | |
| 2012/0181399 | A1 | 7/2012 | O'Keene | |
| 2012/0261529 | A1 * | 10/2012 | Lettkeman | H01Q 1/125 248/231.71 |

OTHER PUBLICATIONS

Tannoy, "Multi Angle Wall Mount," Quick Start Guide, available at least as early as May 10, 2024 (3 pages).
Tannoy, "Multi Angle Wall Mount-WH," <https://www.tannoy.com/tannoy/product?modelCode=0312-ARR> web page visited May 10, 2024 (3 pages).

* cited by examiner

ADJUSTABLE MOUNTING ASSEMBLY

CROSS-REFERENCE TO RELATED APPLICATION

This application claims priority to U.S. Provisional Patent Application No. 63/658,662, filed Jun. 11, 2024, the entire contents of which are incorporated herein by reference.

BACKGROUND

The present disclosure relates to a mounting assembly for mounting an electronic device to a wall.

Electronic devices often include batteries and circuitry to enable the device to transform an electrical input to a physical output. For example, a loudspeaker produces acoustic signals based, in part, on the field strength of the circuitry within the loudspeaker. In another example, a floodlight or display produces light based on the amount and output range of the light-emitting elements thereof. In some scenarios, it is preferable to mount an electronic device (e.g., a speaker or camera) on a vertical wall surface of a structure such as a building or column, etc. Additionally, it is often advantageous to adjust the positioning of the device to set the useful direction thereof.

SUMMARY

In one aspect, the disclosure provides a mounting assembly for an electronic device. The mounting assembly includes a device-side bracket configured to be secured to a rear surface of the electronic device, a tilt bracket pivotably coupled to the device-side bracket, and a pan bracket detachably and pivotably coupled to the tilt bracket. The tilt bracket includes a first wall mount interface. The tilt bracket is securable at a plurality of angles relative to the device-side bracket. The pan bracket includes a second wall mount interface. The mounting assembly is adjustable between a first configuration and a second configuration. In the first configuration, the pan bracket is detached from the tilt bracket, and the first wall mount interface is configured to mount to a wall surface. In the second configuration, the pan bracket is attached to the tilt bracket, and the second wall mount interface is configured to mount to the wall surface.

In another aspect, the disclosure provides a mounting assembly for an electronic device. The mounting assembly includes a device-side bracket configured to be secured to a rear surface of the electronic device and a tilt bracket pivotably coupled to the device-side bracket. The device-side bracket includes a plurality of first apertures. The tilt bracket includes a first rear panel defining a first wall mount interface, and a side panel extending from the first rear panel and defining a plurality of second apertures. The mounting assembly also includes a locking pin configured to extend through one of the plurality of first apertures and one of the plurality of second apertures to secure the tilt bracket at one of a plurality of angles relative to the device-side bracket, and a pan bracket detachably and pivotably coupled to the tilt bracket. The pan bracket includes a second rear panel defining a second wall mount interface. The mounting assembly is adjustable between a first configuration and a second configuration. In the first configuration, the pan bracket is detached from the tilt bracket, and the first wall mount interface is configured to mount to a wall surface. In the second configuration, the pan bracket is attached to the tilt bracket, and the second wall mount interface is configured to mount to the wall surface.

In another aspect, the disclosure provides an electronic device assembly including a column speaker and a mounting assembly. The mounting assembly includes a device-side bracket coupled to a rear surface of the column speaker and a tilt bracket pivotably coupled to the device-side bracket. The device-side bracket includes a plurality of first apertures. The tilt bracket includes a first rear panel defining a first wall mount interface, and a side panel extending from the first rear panel. The side panel defines a plurality of second apertures corresponding with the plurality of first apertures. The mounting assembly also includes a locking pin configured to extend through one of the plurality of first apertures and one of the plurality of second apertures to secure the tilt bracket at one of a plurality of angles relative to the device-side bracket, and a pan bracket detachably and pivotably coupled to the tilt bracket. The pan bracket includes a second rear panel defining a second wall mount interface. The mounting assembly is adjustable between a first configuration and a second configuration. In the first configuration, the pan bracket is detached from the tilt bracket, and the first wall mount interface is configured to mount to a wall surface. In the second configuration, the pan bracket is attached to the tilt bracket, and the second wall mount interface is configured to mount to the wall surface.

Other aspects of the embodiments will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Although the disclosure has been described with reference to certain preferred aspects, variations and modifications exist within the scope and spirit of one or more independent aspects of the disclosure as described. Various features and advantages of the disclosure are set forth in the following claims.

Figure 1:
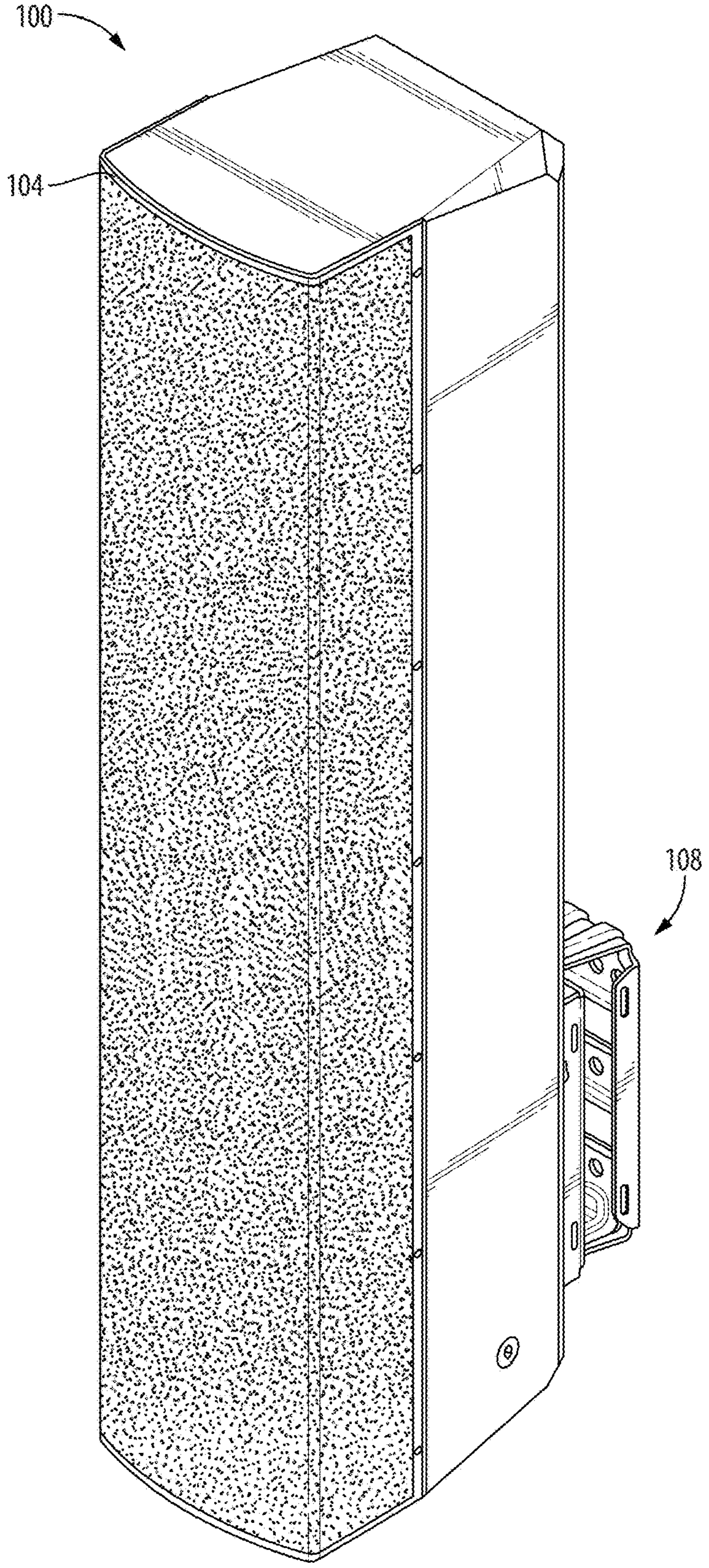
FIG. 1 is a front perspective view of a speaker and mount assembly.
Figure 2:
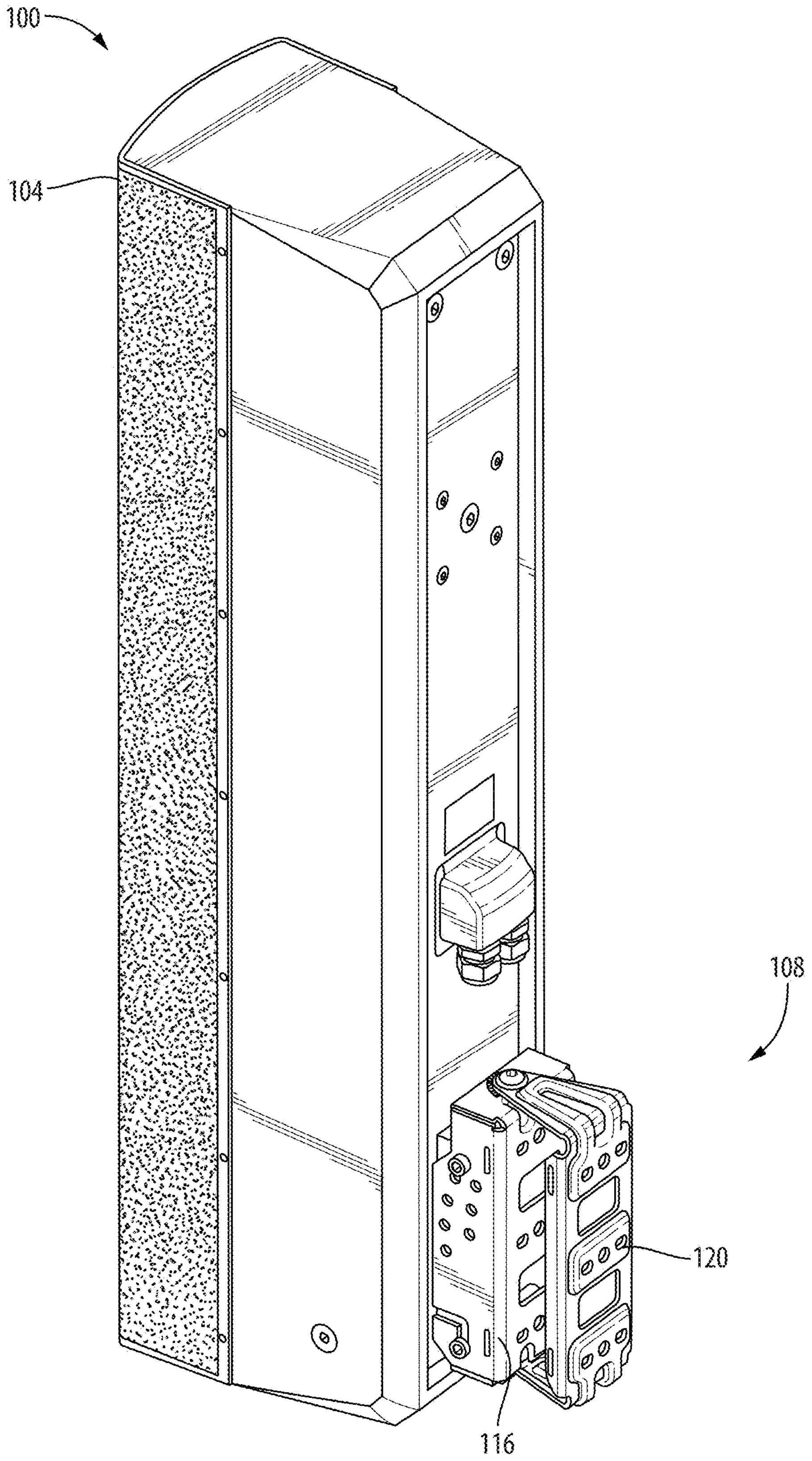
FIG. 2 is rear perspective view of the speaker and mount assembly of FIG. 1.

FIGS. 1-2 illustrate a speaker assembly 100 according to one embodiment of the present disclosure. The speaker assembly 100 includes an electronic audio device 104 (also referred to as a speaker 104 or audio device 104) and a mounting assembly 108 coupled to the electronic audio device 104. The electronic audio device 104 can be, for example, a column speaker, subwoofer, soundbar, surround speakers, etc. that is configured to output audio signals from an electrical input. The electrical input can be received by an external device (e.g., a mobile device) through a physical, corded connection or a wireless connection (e.g., Bluetooth®). The mounting assembly 108 is configured to mount the speaker assembly 100 to a wall or other surface. The wall or surface can be vertical. The mounting assembly 108 can be coupled to a side or portion of the electronic audio device 104 that does not output audio signals. In the illustrated embodiment, the electronic audio device 104 is a column speaker and the mounting assembly 108 is fixedly secured to a rear surface of the electronic audio device 104.

The illustrated mounting assembly 108 is disposed on the bottom (or distal) end of the electronic audio device 104. In other embodiments, the mounting assembly 108 can be coupled to a top end of the electronic audio device 104 or at a central portion between the bottom and top ends. The illustrated mounting assembly 108 is formed such that a height of the mounting assembly 108 is less than half of a height of the electronic audio device 104, and a width of the mounting assembly 108 is less than a width of the electronic audio device 104. In other embodiments, the electronic audio device 104 and the mounting assembly 108 can each have different absolute dimensions and/or relative dimensions in relation to the other component. For example, other constructions and sizes of the electronic audio device 104 can be supported by the illustrated mounting assembly 108 or different embodiments of the mounting assembly 108. Similarly, other constructions and sizes of the mounting assembly 108 can be used to support the illustrated electronic audio device 104 or electronic audio devices according to different embodiments.

Figure 3:
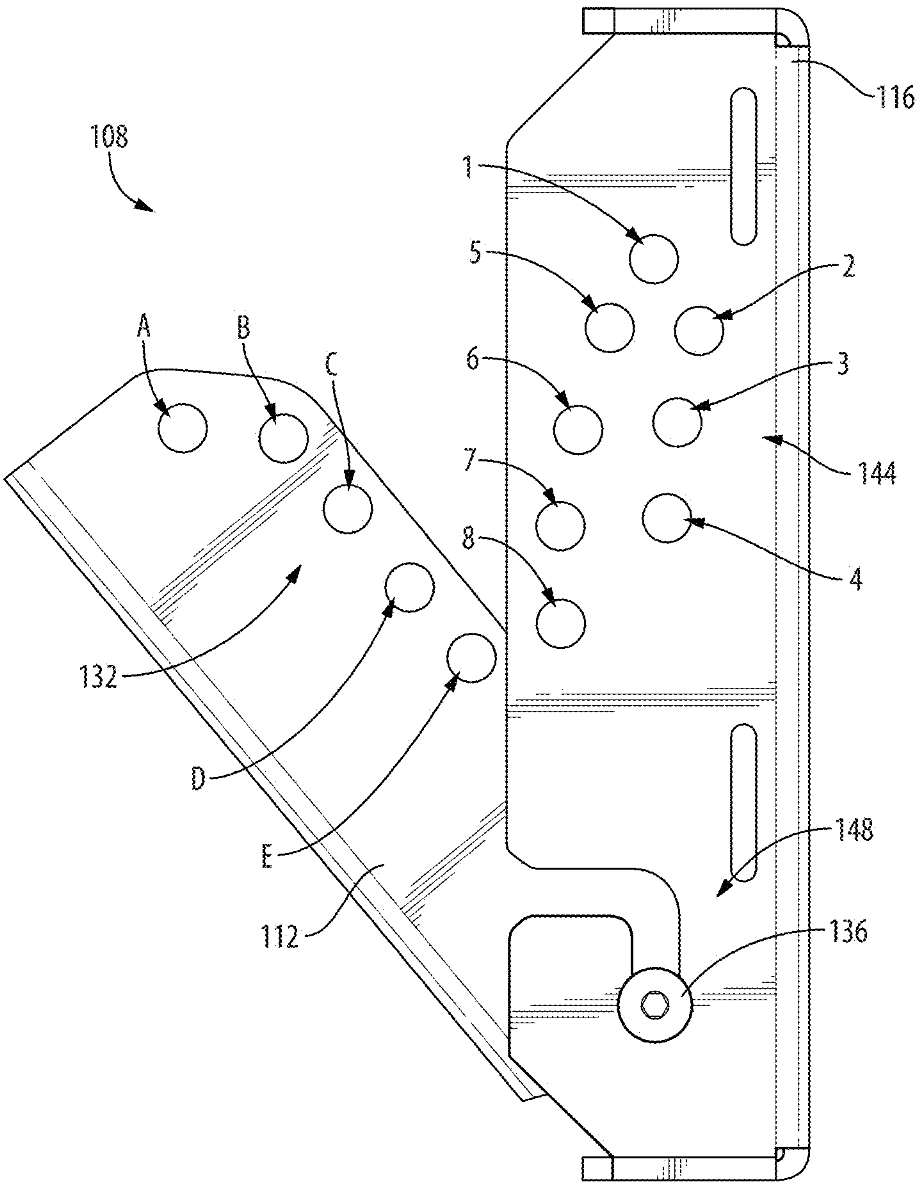
FIG. 3 is a side view of a device-side bracket and a tilt bracket of the mount assembly of FIG. 1.
Figure 4C:
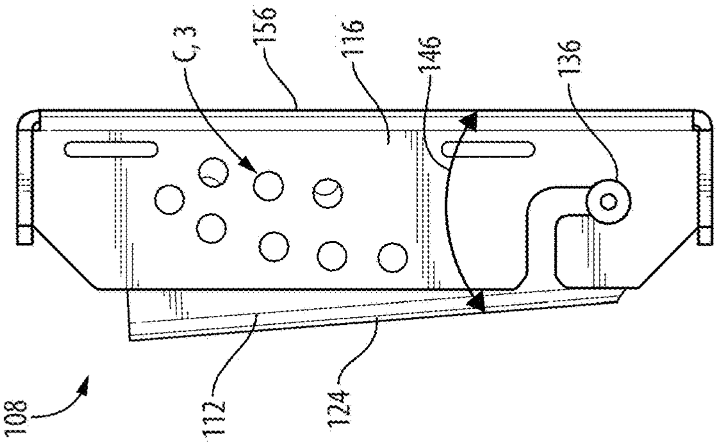
FIG. 4C is a side view of the device-side bracket and the tilt bracket of FIG. 3 positioned in a third mounting position.
Figure 4B:
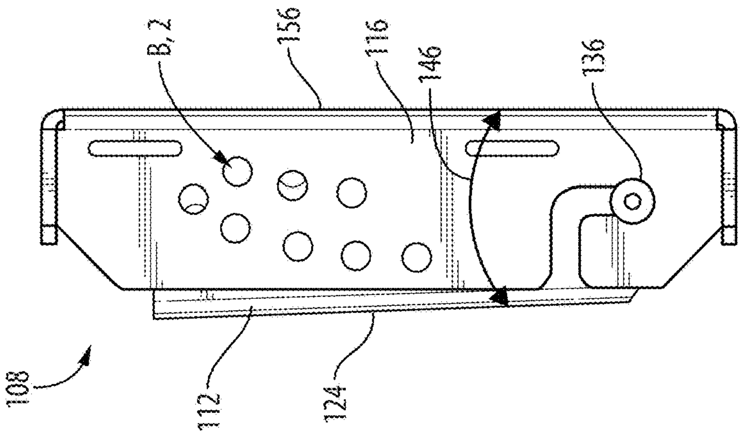
FIG. 4B is a side view of the device-side bracket and the tilt bracket of FIG. 3 positioned in a second mounting position.
Figure 4A:
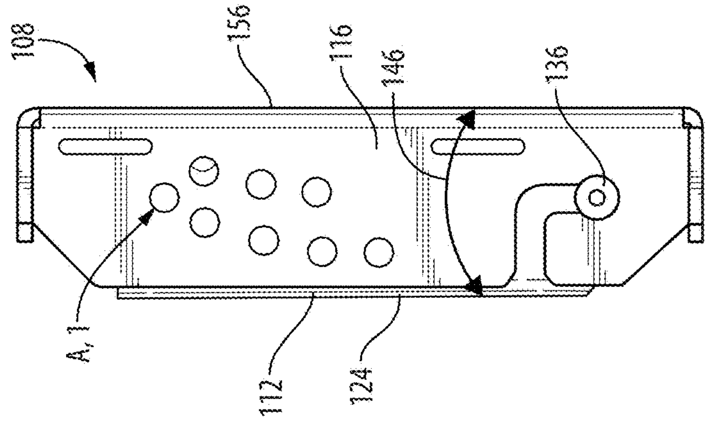
FIG. 4A is a side view of the device-side bracket and the tilt bracket of FIG. 3 positioned in a first mounting position.
Figure 4F:
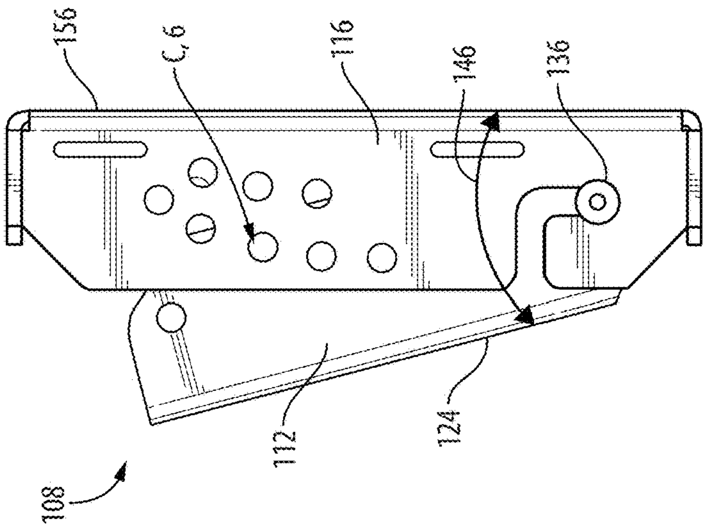
FIG. 4F is a side view of the device-side bracket and the tilt bracket of FIG. 3 positioned in a sixth mounting position.
Figure 4E:
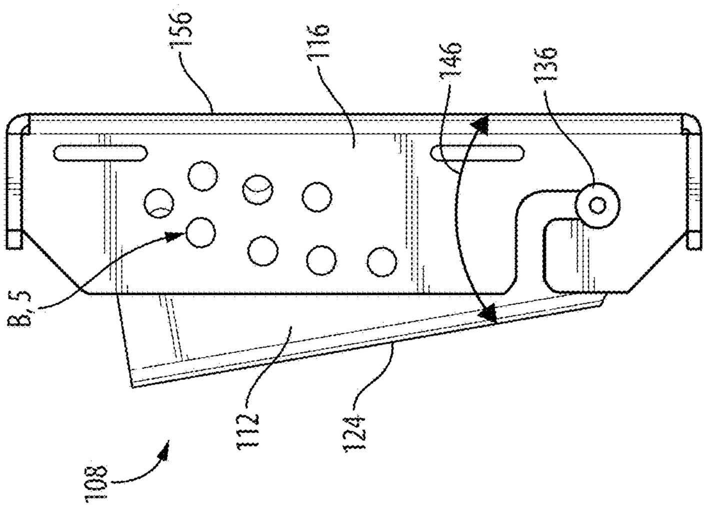
FIG. 4E is a side view of the device-side bracket and the tilt bracket of FIG. 3 positioned in a fifth mounting position.
Figure 4D:
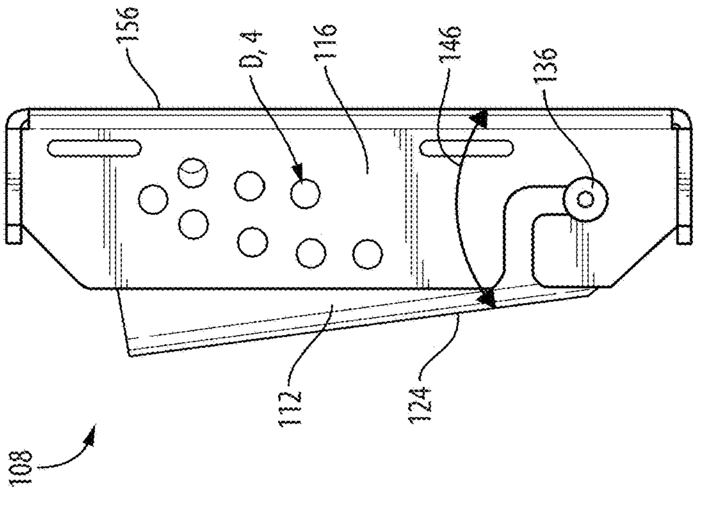
FIG. 4D is a side view of the device-side bracket and the tilt bracket of FIG. 3 positioned in a fourth mounting position.
Figure 4G:
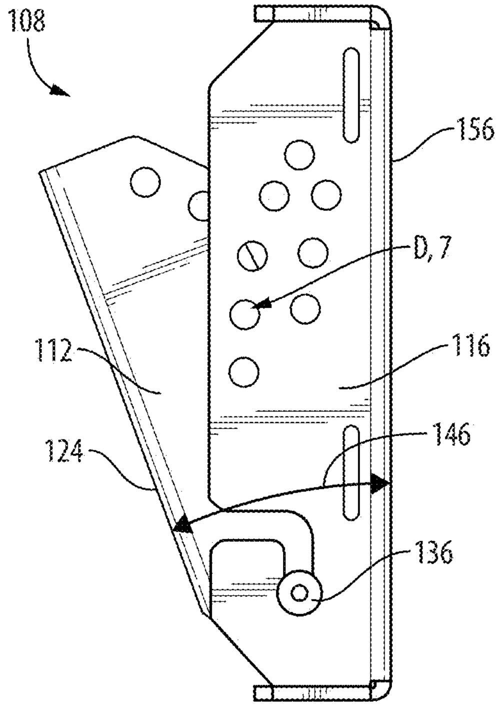
FIG. 4G is a side view of the device-side bracket and the tilt bracket of FIG. 3 positioned in a seventh mounting position.
Figure 4H:
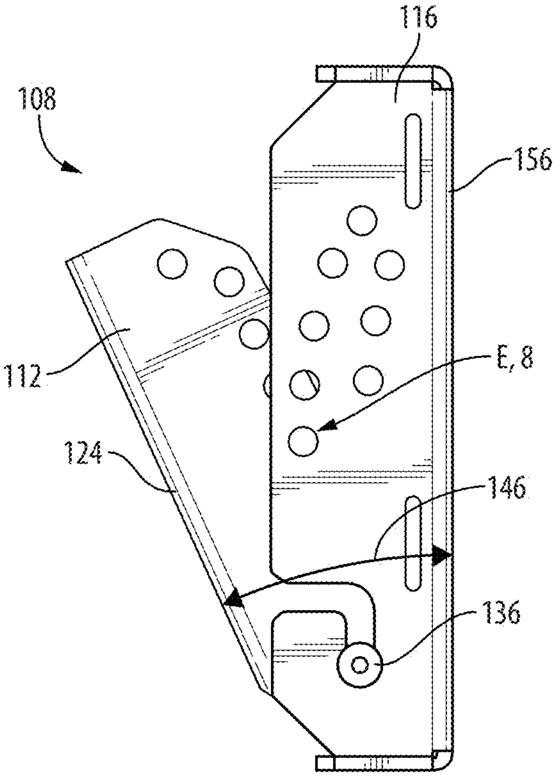
FIG. 4H is a side view of the device-side bracket and the tilt bracket of FIG. 3 positioned in an eighth mounting position.
Figure 5:
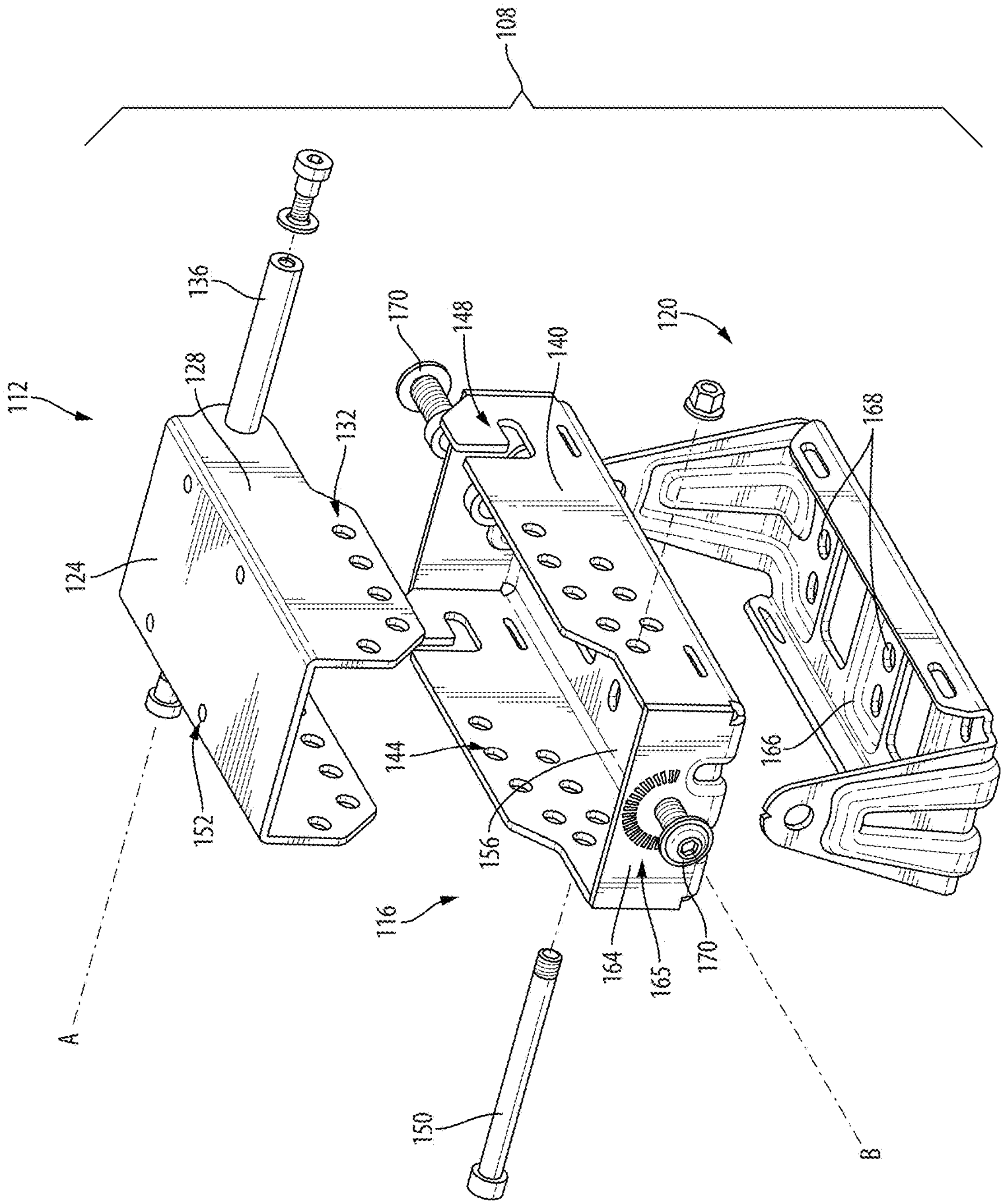
FIG. 5 is an exploded view of the mount assembly of FIG. 1.

With reference to FIGS. 3-5, the mounting assembly 108 includes a device-side bracket 112 (also referred to as a first bracket 112) and a tilt bracket 116 (also referred to as a second bracket 116) coupled to the device-side bracket 112. The device-side bracket 112 is configured to be fixedly secured to the electronic audio device 104. The tilt bracket 116 is pivotably coupled to the device-side bracket 112 about a tilt axis A (also referred to as a first axis A). The tilt axis A is defined by a first pin 136 (also referred to as a pivot pin 136) that extends through the device-side bracket 112 and the tilt bracket 116. In other embodiments, the tilt axis A can be defined by multiple pins or fasteners that each extend through the device-side bracket 112 and the tilt bracket 116. The tilt bracket 116 is adjustable or pivotable relative to the device-side bracket 112 about the tilt axis A between a plurality of angles to adjust an orientation of the electronic audio device 104.

With reference to FIG. 5, the mounting assembly 108 can also include a pan bracket 120 (also referred to as a third bracket 120) coupled to the tilt bracket 116. The pan bracket 120 can be rotatably coupled to the tilt bracket 116 about a pan axis B (also referred to as a second axis B). The illustrated pan axis B is defined by a pair of fasteners 122 that each extend through the tilt bracket 116 and the pan bracket 120. In other embodiments, the pan axis B can be defined by a single pin or fastener that extends through the tilt bracket 116 and the pan bracket 120. The pan bracket 120 is pivotable relative to the tilt bracket 116 about the pan axis B between a plurality of angles to adjust an orientation of the electronic audio device 104.

In the illustrated embodiment, the tilt axis A and the pan axis B are orthogonal. In other embodiments, the tilt axis A and the pan axis B can be oriented oblique to each other. The electronic audio device 104 is adjustable relative to the wall or surface about the tilt axis A and the pan axis B between a broad range of orientations. In other embodiments, additional or fewer components may be included in the mounting assembly 108 that may add or reduce the number of rotational axes of the mounting assembly 108 and thereby increase or decrease the range of motion and degrees of freedom of the mounting assembly 108. In the illustrated embodiment, each of the device-side bracket 112, tilt bracket 116, and pan bracket 120 are formed using sheet metal. In other embodiments, other materials (e.g., plastic) or manufacturing methods (such as casting, welding, molding, machining, etc.) may be utilized to form any or all of the component parts of the mounting assembly 108.

With reference to FIG. 3, the device-side bracket 112 includes a plurality of first apertures 132 and the tilt bracket 116 includes a plurality of second apertures 144. In the illustrated embodiment, the first apertures 132 includes five apertures labeled A-E and the plurality of second apertures 144 includes eight apertures labeled 1-8. The first apertures 132 can be oriented relative to the second apertures 144 such that the device-side bracket 112 and the tilt bracket 116 are fixed at one of a plurality of predetermined angles 146 (one of which is shown in FIG. 4H) relative to one another. The predetermined angle 146 can be defined between a device interface or outer surface 124 of the device-side bracket 112 and a first rear panel 156 of the tilt bracket 116 (shown in FIG. 4H). A locking pin 150 (shown in FIG. 5) can be inserted through one first aperture 132 and one second aperture 144 to secure the device-side bracket 112 and the tilt bracket 116 at the predetermined angle 146. In other embodiments, other components (e.g., ball detents, a friction brake, etc.) may be used to affix the device-side bracket 112 to the tilt bracket 116 at the predetermined angle. The predetermined angle 146 can be, for example, 0 degrees, 2.5 degrees, 5 degrees, 7.5 degrees, 10 degrees, 15 degrees, 20 degrees, 25 degrees, or any other angle suitable to output audio signals from the electronic audio device 104. The number of different predetermined angles 146 depends on the number of first apertures 132 and/or the number of second apertures 144. The illustrated mounting assembly 108 includes eight predetermined angles 146. Stated another way, the illustrated tilt bracket 116 can be locked in place relative to the device-side bracket at eight different predetermined angles 146. In the illustrated embodiment, the number of predetermined angles 146 is equal to the number of first apertures 132. In other embodiments, the number of predetermined angles 146 can be equal to the number of second apertures 132 or a multiple of the number of first or second apertures 132, 144. For example, in other embodiments, there may be the plurality of first apertures 132 and two slots that can each be aligned with each of the first apertures 132. In this embodiment, the number of predetermined angles 146 is equal to two times the number of first apertures 132. In other embodiments, the first and second apertures 132, 144 can include any number of apertures to create a suitable number of predetermined angles 146.

FIGS. 4A-4H illustrate a plurality of values of the predetermined angle 146. The predetermined angle 146 is only illustrated in FIG. 4H. However, it should be appreciated that in each of FIGS. 4A-4H, the predetermined angle 146 is defined between the outer surface 124 of the device-side bracket 112 and the first rear panel 156 of the tilt bracket 116.

FIG. 4A illustrates the mounting assembly 108 at a first mounting position, such that the device-side bracket 112 and the tilt bracket 116 are fixed at a first predetermined angle 146. In the first mounting position, aperture A of the first apertures 132 and aperture 1 of the second apertures 144 are aligned. In this arrangement, the first predetermined angle 146 is 0 degrees. The device-side bracket 112 and the tilt bracket 116 can be parallel to the wall at the first predetermined angle 146. More specifically, the outer surface 124 and the first rear panel 156 can be parallel to the wall at the first predetermined angle 146.

FIG. 4B illustrates the mounting assembly 108 at a second mounting position, such that the device-side bracket 112 and the tilt bracket 116 are fixed at a second predetermined angle 146. In the second mounting position, aperture B of the first apertures 132 and aperture 2 of the second apertures 144 are aligned. In this arrangement, the second predetermined angle 146 is 2.5 degrees.

FIG. 4C illustrates the mounting assembly 108 at a third mounting position, such that the device-side bracket 112 and the tilt bracket 116 are fixed at a third predetermined angle 146. In the third mounting position, aperture C of the first apertures 132 and aperture 3 of the second apertures 144 are aligned. In this arrangement, the third predetermined angle 146 is 5 degrees.

FIG. 4D illustrates the mounting assembly 108 at a fourth mounting position, such that the device-side bracket 112 and the tilt bracket 116 are fixed at a fourth predetermined angle 146. In the fourth mounting position, aperture D of the first apertures 132 and aperture 4 of the second apertures 144 are aligned. In this arrangement, the fourth predetermined angle 146 is 7.5 degrees.

FIG. 4E illustrates the mounting assembly 108 at a fifth mounting position, such that the device-side bracket 112 and the tilt bracket 116 are fixed at a fifth predetermined angle 146. In the fifth mounting position, aperture B of the first apertures 132 and aperture 5 of the second apertures 144 are aligned. In this arrangement, the fifth predetermined angle 146 is 10 degrees.

FIG. 4F illustrates the mounting assembly 108 at a sixth mounting position, such that the device-side bracket 112 and the tilt bracket 116 are fixed at a sixth predetermined angle 146. In the sixth mounting position, aperture C of the first apertures 132 and aperture 6 of the second apertures 144 are aligned. In this arrangement, the sixth predetermined angle 146 is 15 degrees.

FIG. 4G illustrates the mounting assembly 108 at a seventh mounting position, such that the device-side bracket 112 and the tilt bracket 116 are fixed at a seventh predetermined angle 146. In the seventh mounting position, aperture D of the first apertures 132 and aperture 7 of the second apertures 144 are aligned. In this arrangement, the seventh predetermined angle 146 is 20 degrees.

FIG. 4H illustrates the mounting assembly 108 at an eighth mounting position, such that the device-side bracket 112 and the tilt bracket 116 are fixed at an eighth predetermined angle 146. In the eighth mounting position, aperture E of the first apertures 132 and aperture 8 of the second apertures 144 are aligned. In this arrangement, the eighth predetermined angle 146 is 25 degrees.

With reference to FIG. 5, the device-side bracket 112 includes the device interface 124 configured to be coupled to the audio device 104. The device interface 124 includes a plurality of first mount apertures 152. Each first mount aperture 152 is configured to receive a fastener to couple the device-side bracket 112 to the electronic audio device 104. The first mount apertures 152 can be oriented in a geometric array (e.g., rectangular, square, triangular, etc.). The device-side bracket 112 further includes a pair of side panels 128. Each side panel 128 extends generally perpendicular from opposite sides of the device interface 124. Each side panel 128 includes the first plurality of apertures 132. The pin 136 extends through both of the side panels 128 and can be secured to the device-side bracket 112 using a fastener (e.g., nut and bolt, adhesive, etc.). In other embodiments, the pin 136 may be integrally formed with the device-side bracket 112 as one piece. The pin 136 is situated adjacent an end of the device-side bracket 112, for example, a bottom end.

The tilt bracket 116 includes a pair of side panels 140 including the second plurality of apertures 144 configured to align with the first plurality of apertures 132 and a slot 148. Each side panel 140 extends generally perpendicular from opposite sides of the first rear panel 156. The slot 148 of the side panels 140 is configured to receive and hold the pin 136 of the device-side bracket 112. The slot 148 is configured to support the weight of the audio device 104 mounted to the device-side bracket 112. Furthermore, the geometry of the slot 148 allows for the device-side bracket 112 to be secured to the tilt bracket 116 with or without fastening the device-side bracket 112 and the tilt bracket 116 together. In the illustrated embodiment, the slot 148 is an angled, two-part slot. Insertion of the pin 136 to the bottom operational position of the slot 148 requires two separate movements in two separate, angled directions (e.g., about 90-degrees apart). From the opening of the slot 148, the pin 136 first moves along a predominantly horizontal direction before turning substantially vertically downward. In other embodiments, the slot 148 may have other geometries including a curved or arc shape, additional or fewer sections, or detents. Accordingly, a user is not required to support the device-side bracket 112 or associated audio device 104 when aligning and fastening the selected ones of the first plurality of apertures 132 with the selected ones of the second plurality of apertures 144. In some embodiments, the pin 136 may be further configured to fasten to the slot 148.

Figure 6:
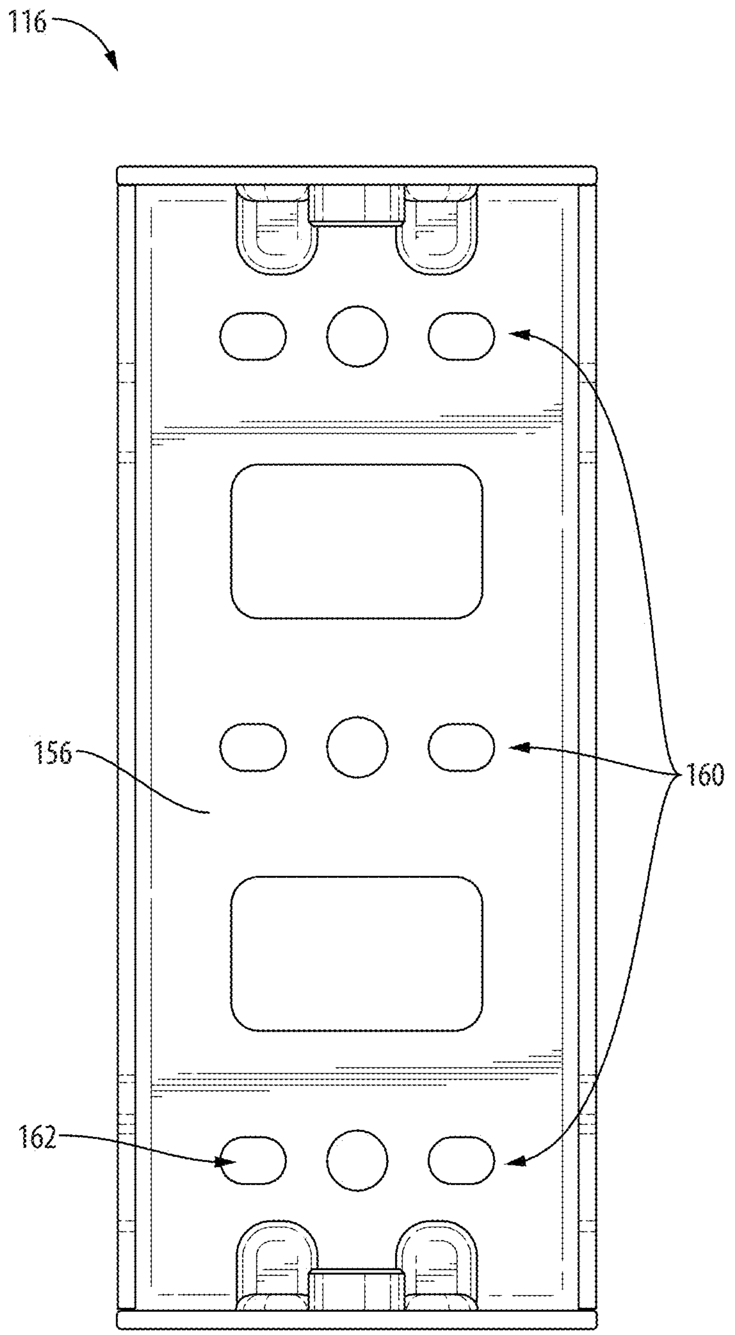
FIG. 6 is a front view of the tilt bracket of FIG. 3.

As shown in FIG. 6, the first rear panel 156 of the tilt bracket 116 defines a first wall mount interface 160. The first wall mount interface 160 is configured to secure the tilt bracket 116 to a wall or other surface. The first wall mount interface 160 includes a plurality of second mount apertures 162. Each second mount aperture 162 is configured to receive a fastener to couple the tilt bracket 116 to the wall or other surface. The second mount apertures 162 can be oriented in a geometric array (e.g., rectangular, square, triangular, etc.). In other embodiments, the wall mount interface may include mating portions configured to attach to a corresponding surface.

Returning to FIG. 5, the tilt bracket 116 includes another pair of side panels 164 configured to rotatably couple to the pan bracket 120. Each side panel 164 extends generally perpendicular from opposite sides of the first rear panel 156. Each side panel 164 extends generally perpendicular to the side panels 140. In the illustrated embodiment, the pan bracket 120 is connected to the tilt bracket 116 using fasteners 122, allowing for the user to control when the mounting assembly 108 is pivotable about the pan axis B and when the mounting assembly 108 is fixed. Differing from incremental or discrete adjustment provided by the tilt axis A, the coupling along the pan axis B allows for infinite adjustment within a range of rotation. One or both of the side panels 164 can include a plurality of raised ribs 165. The raised ribs 165 can be spaced apart from each other by a consistent distance to define a prescribed set of angular pan settings. Furthermore, the pan bracket 120 may be attached or detached to the tilt bracket 116 by respectively fastening or unfastening the respective brackets. The pan bracket 120 further includes a second rear panel 166 defining a second wall mount interface 168 configured to secure the pan bracket 120 to a wall or other surface. As with the first wall mount interface 160, the second wall mount interface 168 includes a plurality of apertures in a geometric array (e.g., rectangular) configured to receive a fastener, however in other embodiments may include other mating configurations known in the art. In the illustrated embodiment, the first wall mount interface 160 and the second wall mount interface 168 have the same geometric shape, allowing for both the tilt bracket 116 and the pan bracket 120 to mate with the same interface interchangeably. In other embodiments, the first wall mount interface 160 and the second wall mount interface 168 may include different geometries and mounting methodologies.

Because the mounting assembly 108 includes the first wall mount interface 160 and the second wall mount interface 168, the mounting assembly 108 can mount to a surface using either the tilt bracket 116 or the pan bracket 120. Accordingly, the mounting assembly 108 is operable in multiple configurations. In a first configuration, the pan bracket 120 is detached from the tilt bracket 116, and the mounting assembly 108 is mounted to a wall surface using the first wall mount interface 160 on the tilt bracket 116. The mounting assembly 108 is not rotatable about the pan axis B. Rather, the mounting assembly 108 is only adjustable between the various predetermined angles 146 about the tilt axis A. Additionally, as the pan bracket 120 is detached, the mounting assembly 108 has a reduced depth in the first configuration, allowing for the mounting assembly 108 to be placed in tighter spaces.

In a second configuration, the pan bracket 120 is attached to the mounting assembly 108 and mounted to the wall surface. Because the pan bracket 120 is attached, the mounting assembly 108 is rotatable about the pan axis B and the tilt axis A. In some embodiments, for example with the pan bracket 120 oriented such that the first wall mount interface 160 can be fastened to a wall surface, the pan bracket 120 does not need to be detached from the mounting assembly 108 in order for the first wall mount interface 160 to secure the mounting assembly 108 to the wall surface. In yet other embodiments, for example when placing the mounting assembly 108 in a corner with approximately orthogonal walls, both the first wall mount interface 160 and the second wall mount interface 168 may be fastened to a respective wall surface. Having multiple configurations and working orientations allows for the mounting assembly to accommodate multiple space, weight, and adjustment requirements.

Figure 7:
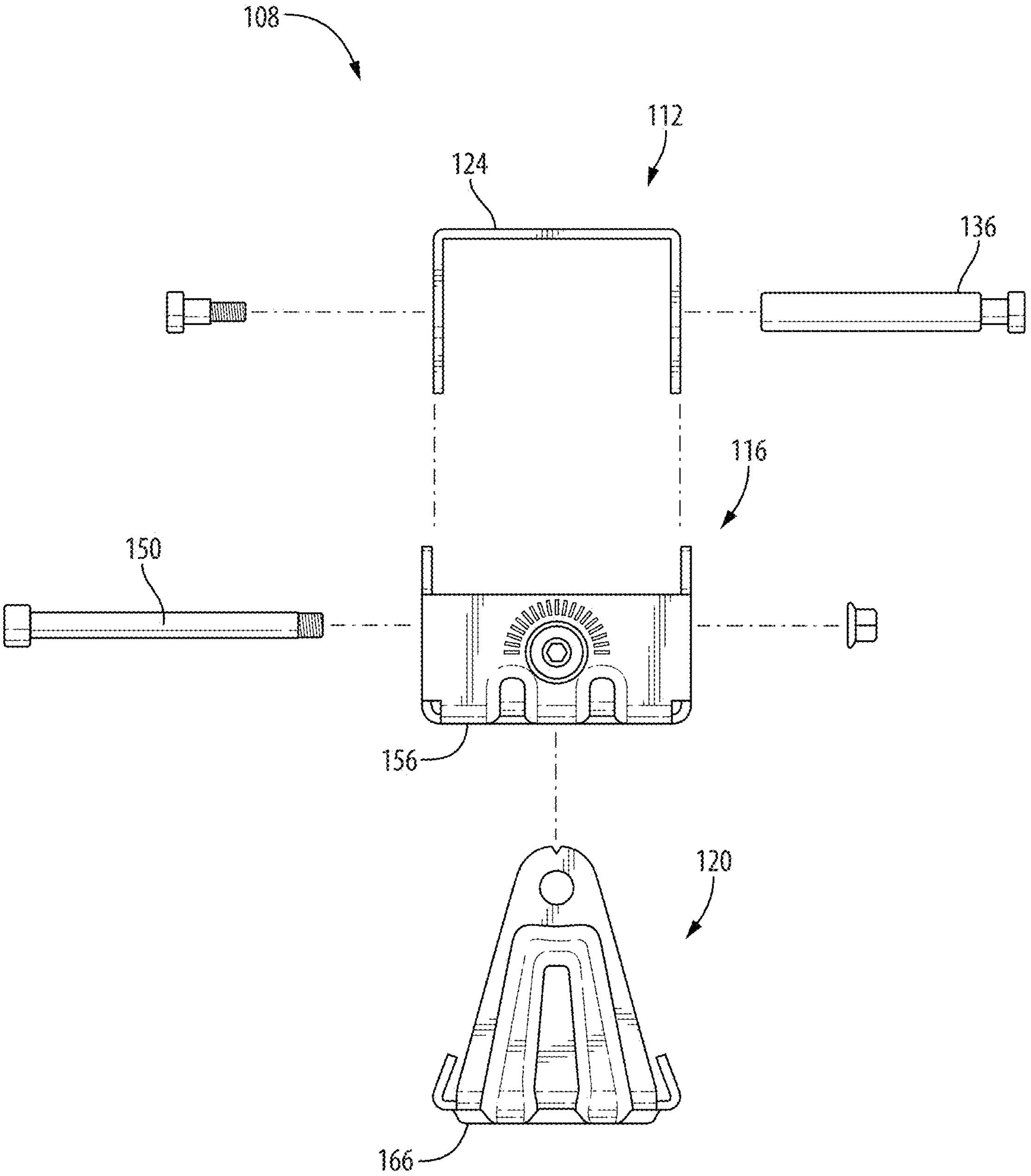
FIG. 7 is another exploded view of the mount assembly of FIG. 1.

In the illustrated embodiments of FIGS. 5 and 7, the surface area of the device interface 124, the first rear panel 156, and the second rear panel 166 are substantially similar. Accordingly, the width or height of a given interface or panel of the mounting assembly 108 is similar to the width or height of the entire mounting assembly 108. With specific attention to FIG. 6, the width of each of the device-mount bracket 112, the tilt bracket 116 and the pan bracket 120 are also configured to be substantially similar. Accordingly, in illustrated embodiment, the audio device 104 has a larger surface area than any of the device interface 124 on the device-side bracket 112, first rear panel 156 of the tilt bracket 116, and the second rear panel 166 of the pan bracket 120.

What is claimed is:

1. A mounting assembly for an electronic device, the mounting assembly comprising:

a device-side bracket configured to be secured to a rear surface of the electronic device, the device-side bracket including a plurality of first apertures;

a tilt bracket pivotably coupled to the device-side bracket, the tilt bracket including a first rear panel defining a first wall mount interface, and a side panel extending from the first rear panel and defining a plurality of second apertures;

a locking pin configured to extend through one of the plurality of first apertures and one of the plurality of second apertures to secure the tilt bracket at one of a plurality of angles relative to the device-side bracket; and a pan bracket detachably and pivotably coupled to the tilt bracket, the pan bracket including a second rear panel defining a second wall mount interface, wherein the mounting assembly is adjustable between a first configuration and a second configuration, wherein in the first configuration, the pan bracket is detached from the tilt bracket, and the first wall mount interface is configured to mount to a wall surface, and wherein in the second configuration, the pan bracket is attached to the tilt bracket, and the second wall mount interface is configured to mount to the wall surface.

2. The mounting assembly of claim 1, wherein the first wall mount interface and the second wall mount interface include respective pluralities of apertures configured to be fastened to the wall surface.

3. The mounting assembly of claim 1, wherein the plurality of angles includes 0, 2.5, 5, 7.5, 10, 15, 20, and 25 degrees.

4. The mounting assembly of claim 1, further comprising a pivot pin extending through the device-side bracket, wherein the tilt bracket includes a slot configured to receive the pivot pin.

5. The mounting assembly of claim 4, wherein the slot is configured to pivotably support the tilt bracket to the device-side bracket without additional support or couplings.

6. The mounting assembly of claim 1, wherein the tilt bracket is pivotably coupled to the device-side bracket about a tilt axis, the pan bracket is pivotably coupled to the tilt bracket about a pan axis, and the pan axis is orthogonal to the tilt axis.

7. An electronic device assembly comprising:

a column speaker; and a mounting assembly including a device-side bracket coupled to a rear surface of the column speaker, the device-side bracket including a plurality of first apertures;

a tilt bracket pivotably coupled to the device-side bracket, the tilt bracket including a first rear panel defining a first wall mount interface, and a side panel extending from the first rear panel, the side panel defining a plurality of second apertures corresponding with the plurality of first apertures;

a locking pin configured to extend through one of the plurality of first apertures and one of the plurality of second apertures to secure the tilt bracket at one of a plurality of angles relative to the device-side bracket; and a pan bracket detachably and pivotably coupled to the tilt bracket, the pan bracket including a second rear panel defining a second wall mount interface, wherein the mounting assembly is adjustable between a first configuration and a second configuration, wherein in the first configuration, the pan bracket is detached from the tilt bracket, and the first wall mount interface is configured to mount to a wall surface, and wherein in the second configuration, the pan bracket is attached to the tilt bracket, and the second wall mount interface is configured to mount to the wall surface.

8. The electronic device assembly of claim 7, wherein the plurality of angles includes 0, 2.5, 5, 7.5, 10, 15, 20, and 25 degrees.

9. The electronic device assembly of claim 7, wherein the tilt bracket is pivotably coupled to the device-side bracket about a tilt axis, the pan bracket is pivotably coupled to the tilt bracket about a pan axis, and the pan axis is orthogonal to the tilt axis.

10. The electronic device assembly of claim 7, wherein the plurality of first apertures includes five apertures, the plurality of second apertures includes eight apertures, and the plurality of angles includes eight angles.

* * * * *